US008438325B2

(12) United States Patent
Reid et al.

(10) Patent No.: US 8,438,325 B2
(45) Date of Patent: May 7, 2013

(54) METHOD AND APPARATUS FOR IMPROVING SMALL WRITE PERFORMANCE IN A NON-VOLATILE MEMORY

(75) Inventors: Robert Alan Reid, Superior, CO (US); Steven L. Shrader, Meridian, ID (US)

(73) Assignee: Cadence Design Systems, Inc., San Jose, CA (US)

(*) Notice: Subject to any disclaimer, the term of this patent is extended or adjusted under 35 U.S.C. 154(b) by 716 days.

(21) Appl. No.: 12/248,690

(22) Filed: Oct. 9, 2008

(65) Prior Publication Data

US 2010/0095046 A1    Apr. 15, 2010

(51) Int. Cl.
*G06F 12/04* (2006.01)
*G06F 12/10* (2006.01)
(52) U.S. Cl.
USPC ................................. 711/103; 711/E12.008
(58) Field of Classification Search ............... 711/103, 711/E12.008
See application file for complete search history.

(56) References Cited

U.S. PATENT DOCUMENTS

| 2003/0101327 | A1* | 5/2003 | Beck ............................. 711/206 |
| 2003/0165076 | A1* | 9/2003 | Gorobets et al. ............. 365/200 |
| 2005/0144358 | A1* | 6/2005 | Conley et al. ................ 711/103 |
| 2006/0031627 | A1* | 2/2006 | Conley .......................... 711/103 |
| 2007/0094440 | A1* | 4/2007 | Torabi .......................... 711/103 |
| 2007/0245181 | A1* | 10/2007 | Suda ............................. 714/718 |
| 2008/0071970 | A1* | 3/2008 | Lin ............................... 711/103 |
| 2008/0189490 | A1* | 8/2008 | Cheon et al. ................. 711/144 |
| 2009/0164705 | A1* | 6/2009 | Gorobets ...................... 711/103 |
| 2010/0095186 | A1* | 4/2010 | Weingarten ................... 714/763 |

OTHER PUBLICATIONS

Lee et al., A Log Buffer-Based Flash Translation Layer Using Fully-Associative Sector Translation, ACM Transactions on Embedded Computing Systems, Jul. 2007, vol. 6, No. 3, Article 18, pp. 18-es, US.
Lee et al., Last: Locality-Aware Sector Translation for NAND Flash Memory-Based Storage Systems, ACM Operating System Review, Oct. 2008, vol. 42, Issue 6, pp. 36-42, US.

* cited by examiner

*Primary Examiner* — Hal Schnee
(74) *Attorney, Agent, or Firm* — Sawyer Law Group, P.C.

(57) ABSTRACT

An invention is provided for improving performance in block based non-volatile memory when performing random small write operations. When requests for small page updates are received for a memory page currently storing data, the updated page data is written to a reserve memory page. The reserve memory page can be in the same memory block as the target memory page, or in an associated reserve memory block. In addition, the associated logical page address is temporarily remapped to the reserve page. Later, when time permits, the page data for the block can be reorganized into continuous pages in a new block.

12 Claims, 5 Drawing Sheets

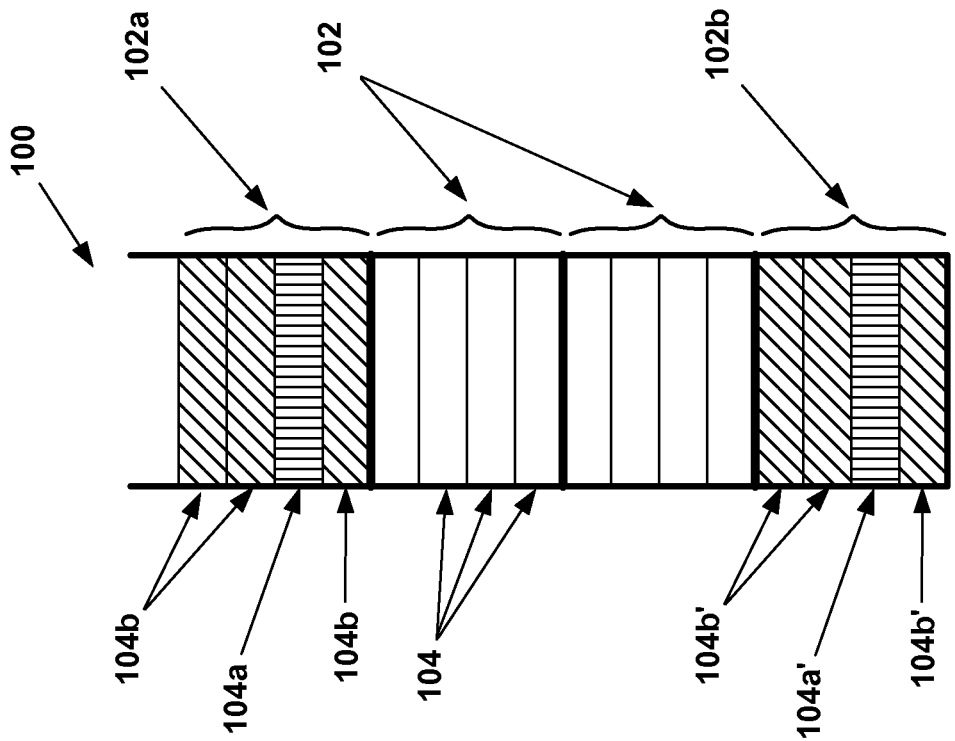
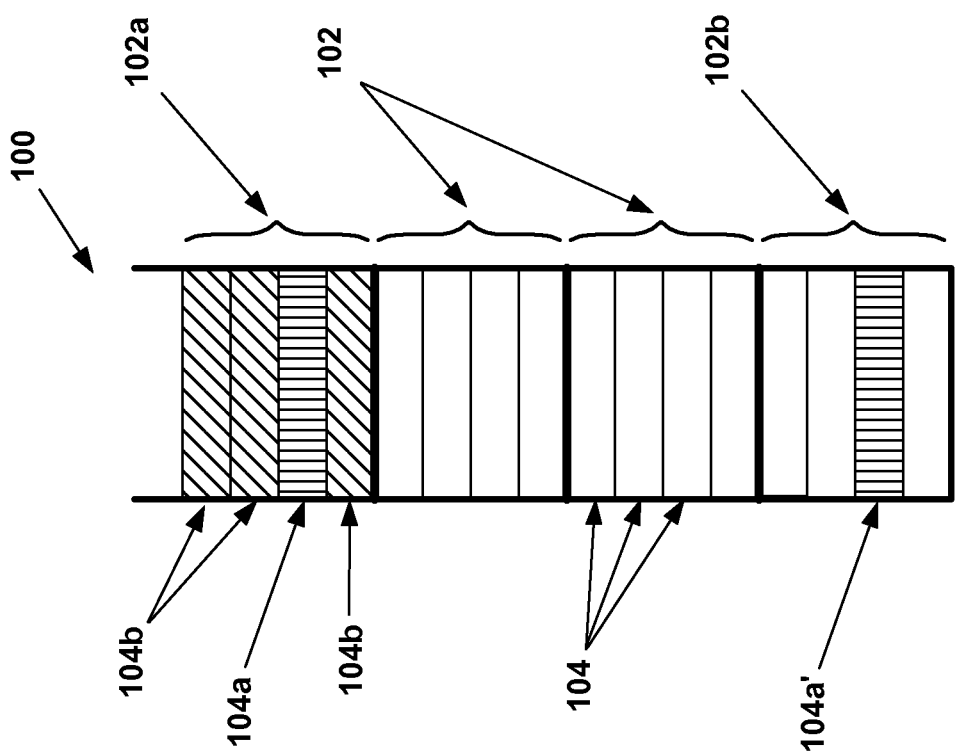

METHOD AND APPARATUS FOR IMPROVING SMALL WRITE PERFORMANCE IN A NON-VOLATILE MEMORY

BACKGROUND OF THE INVENTION

1. Field of the Invention

This invention relates generally to non-volatile memory, and more particularly to improving performance in block based non-volatile memory when performing random small write operations.

2. Description of the Related Art

Non-volatile memory is memory that stores data when power is disconnected from the system. Examples of non-volatile computer memory include Phase-change memory (PCM) and flash memory. Because non-volatile memory retains stored data even when power to the memory is turned off, non-volatile memory is widely used in battery-driven portable devices. For example, non-volatile memory often is utilized in digital audio players, digital cameras, mobile phones, and USB flash drives, which are used for general storage and transfer of data between computers.

Often, non-volatile memory systems are based on blocks of data to increase efficiency when handling large sequential streams of data. However, block based non-volatile memory systems often experience reduced efficiency when handling small and random write streams of data because unlike many other storage devices, non-volatile memory devices generally cannot be overwritten. Hence, to update data in a particular storage location within non-volatile memory, the location must first be erased, then the new data written in its place.

Generally, a memory block is the smallest element of data that can be erased in a block based non-volatile memory system. As a result, when updating data in a non-volatile memory, an entire block must be erased instead of just the particular page or pages of the block that were updated. To increase efficiency, non-volatile memory systems generally create an entirely new memory block having the updated data and remap the logical address of the old memory block to the new physical address of the block. Later, when time allows, the non-volatile memory system erases the old memory block containing the old data.

FIG. 1A is a diagram showing a prior art non-volatile memory 100. The non-volatile system 100 includes a plurality of memory blocks 102, with each memory block comprising a plurality of memory pages 104. To update the data in a page 104a of a memory block 102a, for example, the non-volatile memory controller locates a previously erased memory block, such as memory block 102b, in which to store the data from page 104a once updated. To update the data in memory page 104a, the data from memory page 104a is transferred to the system data buffer, where the data is updated. The updated page data then is read from the system data buffer and written to the corresponding memory page 104a' in the new memory block 102b. After the updated data is stored in the new page 104a' of the new block 102b, the remainder of the memory pages from the original memory block 102a are transferred to the new memory block 102b, as illustrated next with reference to FIG. 1B.

FIG. 1B is a diagram showing the prior art non-volatile memory 100 after transferring the remaining data in the original memory block 102a to the new memory block 102b. As above, the non-volatile memory 100 includes a plurality of memory blocks 102, with each memory block comprising a plurality of memory pages 104. Once the update page data is written to the new memory page 102b, the data in the remainder of the memory pages 104b of the original memory block 102a needs to be transferred to the new memory block 102b. Thus, in the example of FIG. 1B, for each of the remaining memory pages 104b of original memory block 102a, the data is transferred from each old memory page 104b to the corresponding new memory page 104b' in the new memory block 102b. Thereafter, when time permits, the original memory block 102a can be erased.

Unfortunately, this process generally is performed weather an entire memory block is required to be updated or a few bytes are updated. Hence, inefficiencies are encountered when only a few bytes are to be updated. For example, the process described with reference to FIGS. 1A and 1B is performed whether the entire memory page 104a is updated or a single byte of data in memory page 104a is updated. In both cases, the entire memory block 102a is copied to the new memory block 102b. Since an exemplary memory block typically includes sixty-four memory pages, the operations described above require: 1) 1 write of the new page data to the new page 104a' in the new block 102b, 2) 63 reads for the remaining pages in the original memory block 102a, and 3) 63 writes of the pages to the new memory block 102b. As a result, prior art memory systems generally require 127 page operations to update a single byte of data in a page of memory.

In view of the foregoing, there is a need for systems and methods for improving performance in block based non-volatile memory when performing random small write operations. The systems and methods should allow for effective use of memory, while improving memory performance. In addition, the systems and methods should reduce the amount of time required to perform small update operations by not requiring continuous read and write operations for each small random write operation.

SUMMARY OF THE INVENTION

Broadly speaking, embodiments of the present invention address these needs by reserving memory pages for use when updating data during small write operations. For example, in one embodiment a method is disclosed for performing write operation in non-volatile to target memory pages currently storing data. The method includes receiving a request to write update data to a target memory page located in a memory block when the memory page currently stores data. The request is processed by writing the update data to a reserve memory page located within the same memory block, thus avoiding an immediate need to copy all the pages of the memory block to a new memory block. In addition, a logical address associated with the physical address of the target memory page can be remapped to indicate the physical address of the reserve memory page. In general, each memory block can be logically partitioned into user data memory pages and reserve memory pages. The user data memory pages generally are utilized to store user data, and each reserve memory page generally is utilized to store updated page data related to a particular user data memory page within the same memory block. The reserve memory pages in the memory block can have physical addresses near an end of a physical address range of the memory block, or dispersed throughout a physical address range of the memory block depending on the need and design of a particular system. It can sometimes occur that reserve memory pages may be unavailable at a particular time. In such cases, the update data can be written to a memory page of a new memory block when a free reserve memory page is currently unavailable in the memory block.

A further embodiment, multiple memory blocks are associated with a reserve memory block to improve performance during small write operations. The method includes associating a set of at least two memory blocks with a single reserve memory block, which comprises a plurality of reserve memory pages. The memory pages located within the set of memory blocks generally are user data memory pages used to store user data, while each reserve memory page is utilized to store updated page data related to a particular user data memory page within the set of memory blocks. Continuing with the method, a request to write update data to a target memory page is received, wherein the target memory page currently stores data and is located in one of the memory blocks of the set of memory blocks. The request is processed by writing the update data to a reserve memory page located in the reserve memory block. Once the update data is written to the reserve memory page, the logical address associated with the physical address of the target memory page can be remapped to indicate a physical address of the reserve memory page.

In a further embodiment, a non-volatile memory is disclosed that includes logical divisions to improve efficiency during small write operations. In this embodiment, the memory pages of each memory block are logically divided into user data memory pages and reserve memory pages. In this manner, as discussed above, data requested to be written to a target user data memory page in a memory block is written to a reserve memory page in the same memory block whenever the target user data memory page currently stores data, and reserve memory pages are currently available. Once the data is written to the reserve memory page, the logical address associated with the physical address of the target memory page can be remapped to indicate a physical address of the reserve memory page. For example, the logical address can be stored in a block table associated with the non-volatile memory and updated to indicate the actual physical address of the updated data. In another example, the logical address can be located within a spare area of the target user data memory page to indicate the actual physical address of the updated data. Alternatively, the logical address can be located in a spare area of the reserve memory page and can be mapped to indicate a physical address of the target user data memory page.

In this manner, the number of write operations required to perform a small page update is greatly reduced. Moreover, the memory block data can be reorganized when time permits, such as when the system is idle. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 1A is a diagram showing a prior art non-volatile memory;

FIG. 1B is a diagram showing the prior art non-volatile memory after transferring remaining page data in the original memory block to a new memory block;

DETAILED DESCRIPTION OF THE PREFERRED EMBODIMENTS

An invention is disclosed for improving performance in block based non-volatile memory when performing random small write operations. Broadly speaking, embodiments of the present invention improve performance by reserving memory pages for use during small write operations. When requests for small page updates are received, the updated page data is written to a reserve memory page. In addition, the associated logical page address is temporarily remapped to the reserve page. Later, when time permits, the page data for the block can be reorganized into continuous pages in a new block.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
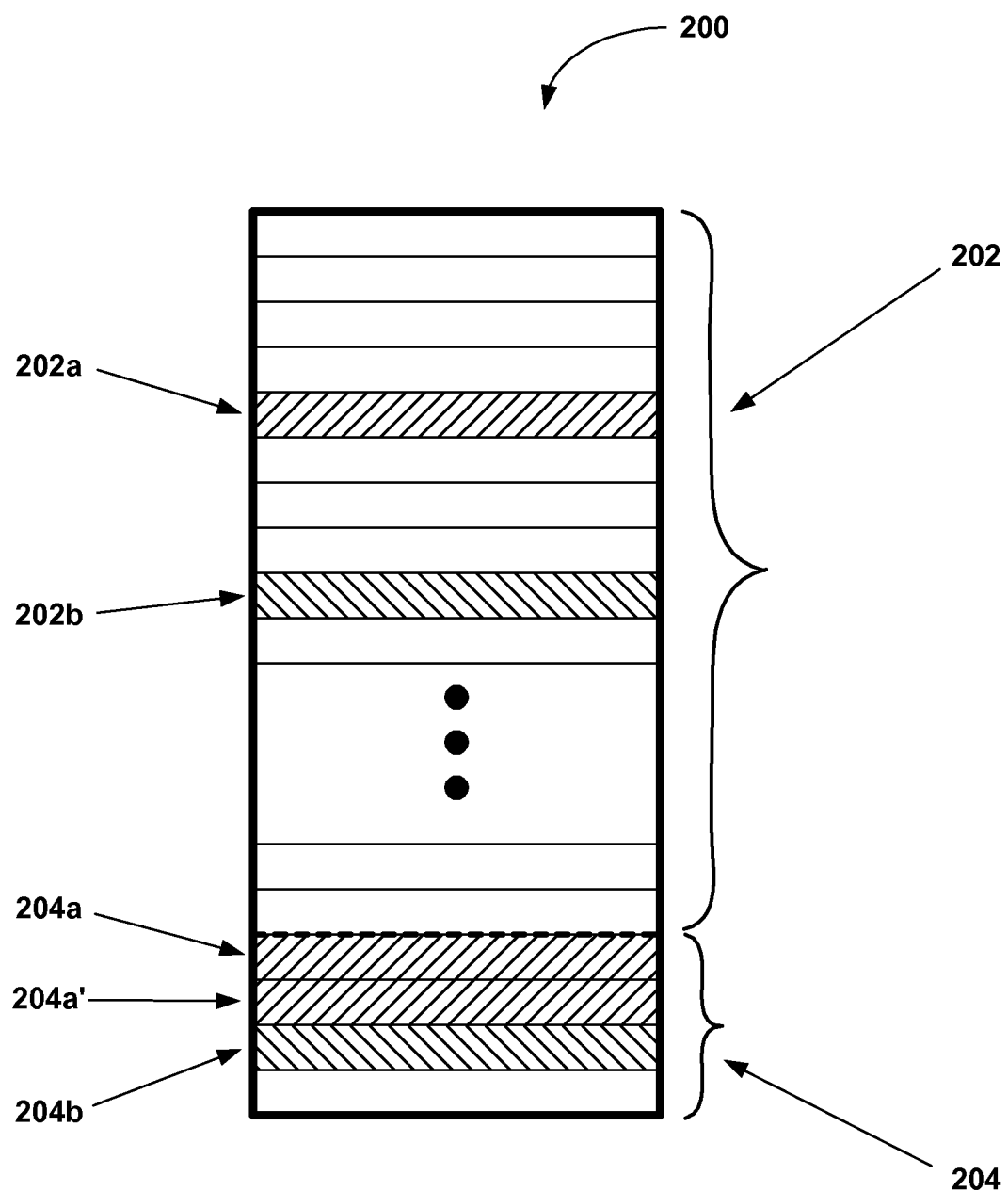
FIG. 2 is a diagram showing an exemplary non-volatile memory block having reserve memory for small write operations, in accordance with an embodiment of the present invention.

FIGS. 1A and 1B were described in terms of the prior art. FIG. 2 is a diagram showing an exemplary non-volatile memory block 200 having reserve memory for small write operations, in accordance with an embodiment of the present invention. As mentioned above, embodiments of the present invention reserve a plurality of memory pages, hereinafter termed reserve memory pages 204, for use during small write operations. Hence, in FIG. 2, memory block 200 includes a plurality of user data memory pages 202 for use in storing user data and a plurality of reserve memory pages 204 for use in performing small write operates. Although labeled differently, it should be noted that the user data memory pages 202 and reserve memory pages 204 generally are physically the same type of memory pages utilized in non-volatile memory. However, embodiments of the present invention reserve a plurality of memory pages for use during small write operations.

The number of pages reserved can vary depending on the particular needs of a system. For example, in the exemplary embodiment illustrated in FIG. 2, the memory block 200 can include a total of 64 memory pages. Of these, 60 memory pages are utilized as user data memory pages 202 and four memory pages have been reserved as reserve memory pages 204. However, it should be noted that any number of memory pages can be allocated as reserve memory pages 204, for example, a memory block 200 can reserve two memory pages as reserve memory pages 204, or if more pages are required, a particular system could reserve eight or more pages as reserve memory pages 204.

In operation, when a new block is allocated from non-volatile memory, embodiments of the present invention allocate a predefined number of user data memory pages 202 for data and reserve a predefined number of reserve memory pages 204 for future small write updates. Then, when a request to perform a small write operation to a target memory page currently storing data, embodiments of the present invention perform the write operation to a reserve memory page 204 of the memory block 200 instead of allocating a new memory block and transferring all page data to the new block. The physical address of the selected reserve memory page 204 is then mapped to the logical address of the target memory page updated. Later, when time permits, the memory block can be reorganized to have continuous addressing.

In the example, FIG. 2 memory block 200 includes pages 202a and 202b, which both currently store user data. When a request to update page 202a of memory block 200 is received, the updated page data cannot be written directly to page 202a because, in the example of FIG. 2, page 202a currently stores data. Instead of immediately searching for a free memory block, embodiments of the present invention determine whether a reserve memory page 204 is currently available in the memory block 200. If a reserve memory page 204 is currently available, the updated page data is written to the available reserve memory page 204 and the logical address for page 202a is updated to indicate the page data is now stored at the physical address of the reserve memory page.

For example, in FIG. 2, the updated page data for memory page 202a is written to reserve memory page 204a and the logical address of page 202a is updated to indicate the page data is now stored at the physical address of memory page 204a. If a second request to update page 202a is received, the updated page data for memory page 202a is written to reserve memory page 204a' and the logical address of page 202a is updated to indicate the page data is now stored at the physical address of memory page 204a'. To continue the example, if a request to update page 202b is received, the updated page data for memory page 202b is written to reserve memory page 204b and the logical address of page 202b is updated to indicate the page data is now stored at the physical address of memory page 204b.

In this manner, the number of write operations required to perform a small page update is greatly reduced. However, as a result of the use of the reserve memory pages 204, the data for the memory block 200 is no longer in continuous addresses. To address this issue, embodiments of the present invention can reorganize the memory block data when time permits, such as when the system is idle. For example, when time permits, a free memory block can be obtained and the data in the memory block 200 of FIG. 2 can be written to the free memory block in a continuous order, as illustrated in FIG. 3.

Figure 3:
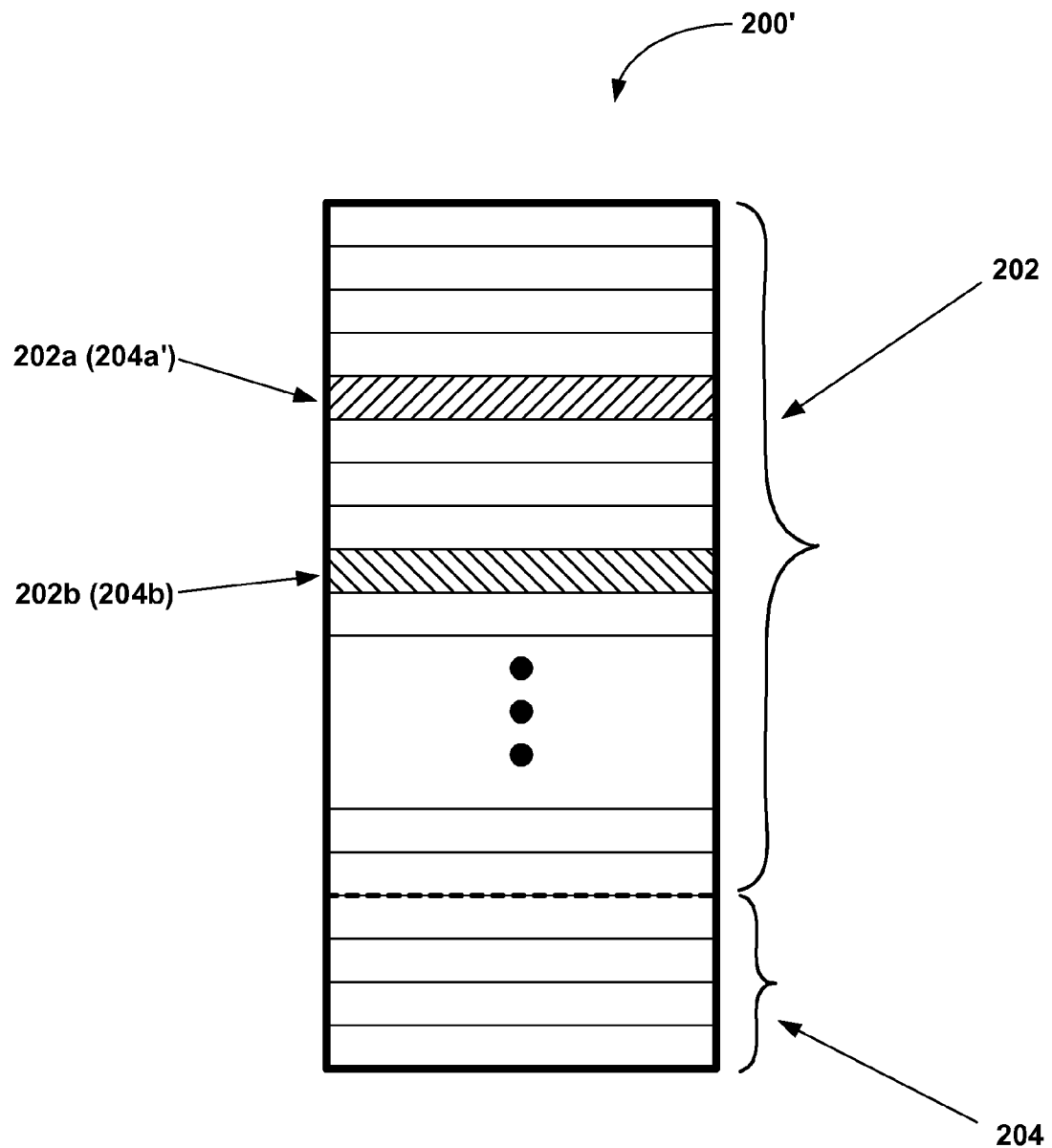
FIG. 3 is a diagram showing an exemplary non-volatile memory block storing data from memory block in a continuous order, in accordance with an embodiment of the present invention.

FIG. 3 is a diagram showing an exemplary non-volatile memory block 200' storing data from memory block 200 in a continuous order, in accordance with an embodiment of the present invention. As above, memory block 200' includes a plurality of user data memory pages 202 for use in storing user data and a plurality of reserve memory pages 204 for use in performing small write operates. When writing data from memory block 200 to memory block 200', the reserve memory pages 204 of memory block 200 are written to appropriate physical addresses within the new memory block 200'. For example, the most up to date page data for memory page 202a is stored in reserve memory page 204a' in memory page 200. Hence, the page data stored in reserve memory page 204a' in memory block 200 is copied to page 202a of the new memory block 200', which corresponds to page 202a of memory block 200 (i.e., has the same page address offset). Similarly, the most up to date page data for memory page 202b is stored in reserve memory page 204b in memory block 200. Hence, the page data stored in reserve memory page 204b in memory block 200 is copied to page 202b of the new memory block 200', which corresponds to page 202b of memory block 200. The logical addresses corresponding to the memory pages 202 and 204 then are updated to indicate the corresponding pages in memory block 200'.

Figure 4:
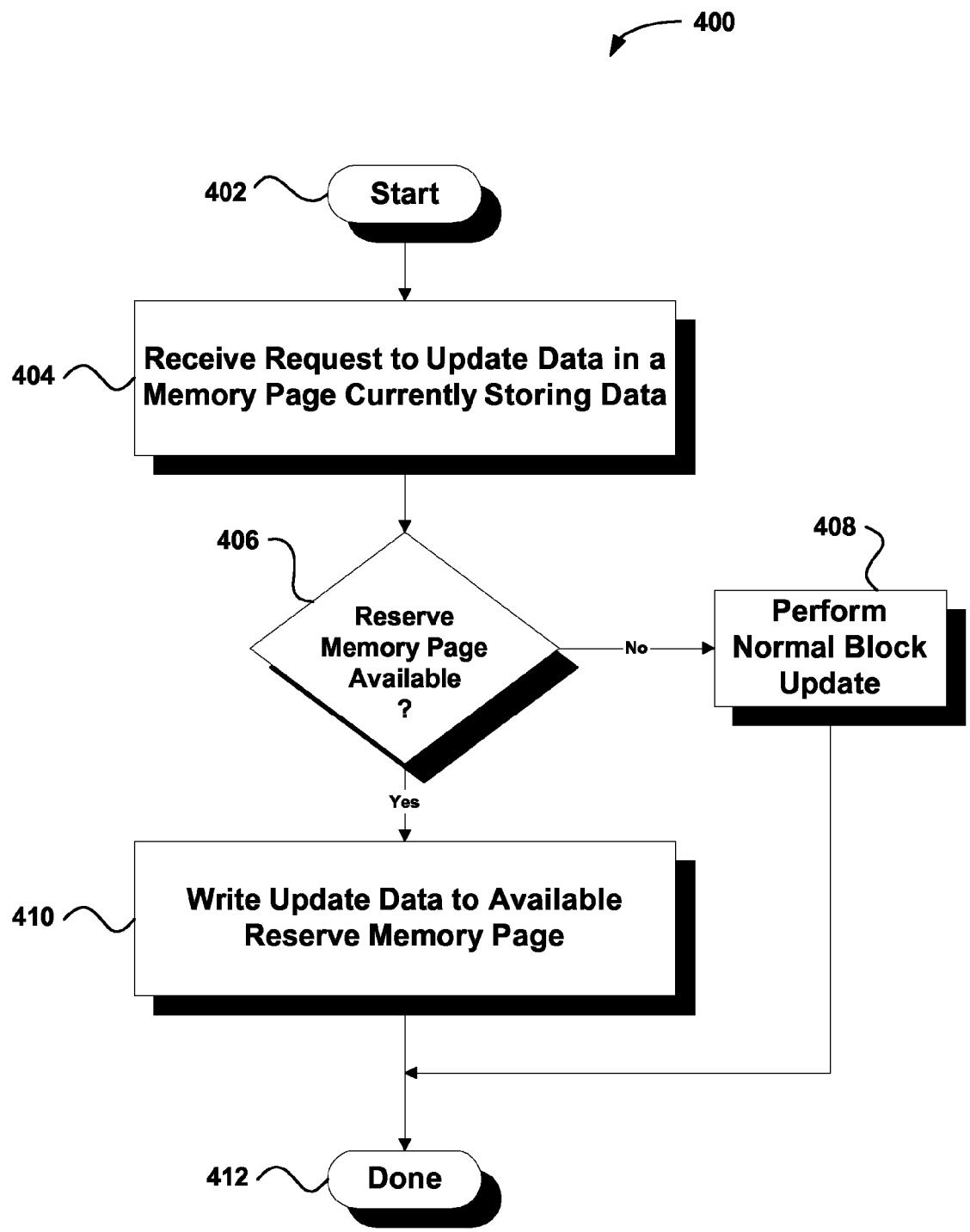
FIG. 4 is a flowchart showing a method for improving performance during small write operates in a non-volatile memory, in accordance with an embodiment of the present invention.

FIG. 4 is a flowchart showing a method 400 for improving performance during small write operates in a non-volatile memory, in accordance with an embodiment of the present invention. In an initial operation 402, preprocess operations are performed. Preprocess operations can include, for example, determining a number of memory pages to reserve in each memory block of non-volatile memory, updating data stored in non-volatile memory as requested by the system, and other preprocess operations that will be apparent to those skilled in the art after a careful reading of the present disclosure.

In operation 404, a request is received to update data in a target memory page currently storing user data. When a request to write data to a memory page is received, a determination generally is made as to whether the target memory page currently stores data. When the memory page currently stores data, as in operation 404, the update data cannot be written directly to the target memory page due to limitations in the nature of non-volatile memory. Hence, embodiments of the present invention utilize available reserve memory pages to improve performance during the small write operation, as discussed below.

Once the request is received, a decision is made as to whether a reserve memory page is currently available in the memory block storing the target memory page, in operation 406. For example, referring to FIG. 2, when a request to update memory page 202a is received, a determination is made as to whether a reserve memory page 204 currently is available. That is, a determination is made as to whether a reserve memory page 204 that does not currently store data is present in memory block 200. Referring back to FIG. 4, if a reserve memory page is currently unavailable in the memory block storing the target memory page, the method 400 branches to operation 408. Otherwise, the method 400 continues to operation 410.

When a reserve memory page is currently unavailable in the memory block storing the target memory page, a normal block update is performed in operation 408. When performing a normal block update the non-volatile memory controller locates a new previously erased memory block in which to store the updated page data for the target page. The updated page data then is written to the corresponding memory page in the new memory block. After the updated page data is stored in the new page of the new memory block, the remaining memory pages from the original memory block are copied to corresponding memory pages of the new memory block. Thereafter, when time permits, the original memory block can be erased.

When a reserve memory page is currently available in the memory block storing the target memory page, the updated page data is written to an available reserve memory page, in operation 410. For example, returning to the example of FIG. 2, after determining that an available reserve memory page is available in memory block 200, the updated page data for target memory page 202a is written to reserve memory page 204a. In addition to writing the updated page data to the reserve memory page 204a, the logical address for target memory page 202a is updated to indicate the current page data for memory page 202a is located at the physical address for reserve memory page 204a.

A plurality of methods can be utilized to determine whether a free reserve memory page is available and to remap the logical address of a target memory page to the physical address of the reserve memory page storing the updated page data. For example, in one embodiment page mapping is added to a block table residing in memory. The block table generally includes, among other data, data that indicates the mapping between logical addresses of user data and the actual physical addresses of user data. In a block based system, the block table generally maps logical addresses of memory blocks to physical addresses of memory blocks within the non-volatile memory.

However, embodiments of the present invention can add page mapping to the block table. More specially, block data structures storing data regarding individual memory blocks can also include page offset data. The page offset data can indicate whether a particular memory page has been updated such that the current page data is stored in a reserve memory page. For example, a page entry having a value of zero can indicate the related memory page has not been updated and the valid memory page is the original memory within the related memory block. A non-zero value for a page entry can indicate the offset to the particular reserve memory page within the memory block storing the current updated page data for the related memory page.

Further embodiments can utilize a flag associate with each memory block in the block table. The flag can indicate whether a particular memory block includes current data stored in reserve memory pages, thus resulting in pages that are "out of order" with respect to the logical page addresses within the same memory block. This allows for faster processing of blocks that do not have "out of order" pages because subsequent address processing is not required for these pages.

In addition, the spare area of each memory page can be utilized to indicate whether the memory page has been updated and if so, where the current updated page data is stored. As will be apparent to those skilled in the art after a careful reading of the present disclosure, non-volatile memory pages often include a data area and a spare area. The data area is used to store user data within the memory page, while the spare area often is used to store error detection data, such as error correction codes (ECC) for the page.

In a further embodiment, an offset to the original user data memory page can be included in the spare area of a reserve memory page if the reserve memory page stores updated page data for the original user data memory page. Using this method, the spare areas of the reserve memory pages are examined to determine whether the reserve memory page stores valid data for a particular user data memory page in the memory block. If the reserve memory page stores valid data for a particular user data memory page, the offset data stored in the spare area of the reserve memory page indicates the offset to the original user data memory page related to the updated page data.

Post process operations are performed in operation 412. Post process operations can include updating related logical address to physical address mapping for the non-volatile memory, reordering of the page data during system idle periods, and other post process operations as will be apparent to those skilled in the art after a careful reading of the preset disclosure. As mentioned previously, the data for a memory block may no longer be in continuous addresses because of the use of the reserve memory pages. To address this issue, when time permits, such as when the system is idle, a free memory block can be obtained and the data in stored in the target memory block can be written to the free memory block in a continuous order.

For example, referring to FIG. 3, when writing data from memory block 200 to memory block 200', the reserve memory pages 204 of memory block 200 are written to appropriate physical addresses within the new memory block 200'. For example, the most up to date page data for memory page 202a is stored in reserve memory page 204a' in memory page 200. Hence, the page data stored in reserve memory page 204a' in memory block 200 is copied to page 202a of the new memory block 200', which corresponds to page 202a of memory block 200. Similarly, the page data stored in reserve memory page 204b in memory block 200 is copied to page 202b of the new memory block 200', which corresponds to page 202b of memory block 200. The logical addresses corresponding to the memory pages 202 and 204 then are updated to indicate the corresponding pages in memory block 200'.

Figure 5:
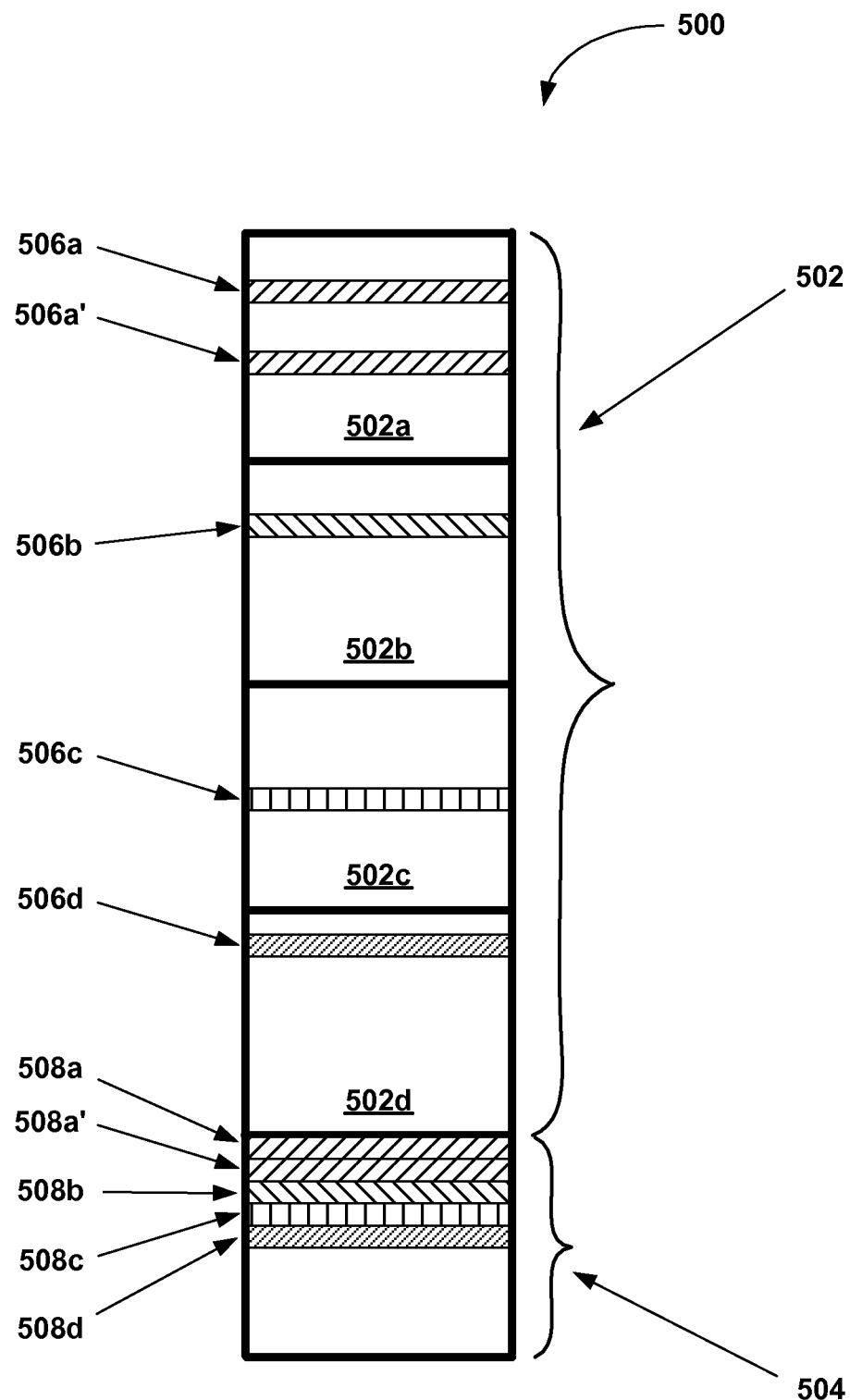
FIG. 5 is a diagram showing a plurality of associated memory blocks having a reserve memory block, in accordance with an embodiment of the present invention.

In addition to reserving memory pages in each memory block, embodiments of the present invention can reserve memory pages in a reserve memory block, which is associated with a plurality of user data memory blocks. FIG. 5 is a diagram showing a plurality of associated memory blocks 500, in accordance with an embodiment of the present invention. The plurality of associated memory blocks 500 includes a plurality of user data memory blocks 502 and an associated reserve memory block 504. Each user data memory block 502 includes a plurality of user data memory pages, similar to the user data memory pages of FIG. 2. However, in the embodiment of FIG. 5, the user data memory blocks 502 generally do not include reserve memory pages, which generally are included in the reserve memory block 504. Hence, in one embodiment, the reserve memory block 504 generally includes only reserve memory pages. However, it should be noted that embodiments can be implemented that include reserve memory pages in user data memory blocks and user data memory pages in reserve memory blocks, depending on the needs of a particular system.

In operation, when a request is received to perform a small write operation to a target memory page currently storing data, embodiments of the present invention perform the write operation to a reserve memory page in the reserve memory block 504 associated with the user data memory block 502 including the target memory page. The physical address of the selected reserve memory page then is mapped to the logical address of the particular target memory page that was updated. Later, when time permits, the target memory block is reorganized to have continuous addressing.

The exemplary associated memory blocks 500 of FIG. 5 include four user data memory blocks 502a-502d associated with a reserve memory block 504. Although FIG. 5 illustrates a memory block set 502 having four user data memory blocks, it should be noted that any number of user data memory blocks 500 can be associated with a reserve memory block 504 to form a set of associated memory blocks 500. To further illustrate the advantageous manner in which small write operations can be processed using the embodiments of the present invention, a further example of these operations will be described next. In the following example user data memory pages 506a, 506a', 506b, 506c, and 506d all currently store user data, and as such cannot be directly overwritten with new data until erased.

When a request to update memory page 506a of user data memory block 502a is received, the updated page data cannot be written directly to memory page 506a because, in the example of FIG. 5, page 506a currently stores data. Instead of immediately searching for a free memory block, embodiments of the present invention determine whether a reserve memory page is currently available in the reserve memory block 504. If a reserve memory page is currently available, the updated page data is written to the available reserve memory page and the logical address for page 506a is updated to indicate the page data is now stored at the physical address of the selected reserve memory page in the reserve memory block.

For example, in FIG. 5, the updated page data for memory page 506a in user data memory block 502a is written to reserve memory page 508a in the reserve memory block 504 and the logical address of page 506a is updated to indicate the page data is now stored at the physical address of reserve memory page 508a in the reserve memory block 504. Similarly when a request to update page 506a' in user data memory block 502a is received, the updated page data for memory page 506a' is written to reserve memory page 508a' in the reserve memory block 504 and the logical address of page 506a' is updated to indicate the page data is now stored at the physical address of memory page 508a' in the reserve memory block 504.

To continue the example, if a request to update page 506b in user data memory block 502b is received, the updated page data for memory page 506b also is written to the reserve memory block 504, at reserve memory page 508b. Similarly, an update to page 506c is written to reserve memory page 508c in the reserve memory block 504, an update to page 506d is written to reserve memory page 508d in the reserve memory block 504, and an update to page 506d is written to reserve memory page 508d in the reserve memory block 504.

Similar to FIG. 2, as a result of the use of the reserve memory pages being utilized to store page data updates, the data for each of the user data memory blocks 502 may no longer be in continuous physical addresses. To address this issue, embodiments of the present invention reorganize the memory block data when time permits, such as when the system is idle. For example, when time permits, a free set of memory blocks can be obtained and the data in the user data memory blocks 502 of FIG. 5 written to the free memory blocks in a continuous order, substituting the updated page data in the reserve memory pages of the reserve memory block 504 for corresponding offset page addresses in the new memory block. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing a write operation in non-volatile memory, the non-volatile memory having a plurality of memory blocks, each memory block including a plurality of memory pages, comprising the operations of:
receiving a request to write small update data to a target memory page in a memory block, wherein the target memory page currently stores data;
writing the small update data to a reserve memory page and including offset data within a spare area of the reserve memory page to indicate an offset to the target memory page related to the small update data, wherein the reserve memory page is located within the memory block, wherein a logical address associated with a physical address of the target memory page is temporarily remapped to indicate a physical address of the reserve memory page; and
writing the small update data from the reserve memory page and remaining data from the memory block to a new memory block in continuous order when time permits during system idle periods.

2. The method of claim 1, further comprising the operation of logically partitioning the memory block into user data memory pages and reserve memory pages, wherein user data memory pages are utilized to store user data, and wherein each reserve memory page is utilized to store updated page data related to a user data memory page within the same memory block.

3. The method of claim 1, wherein the memory block includes a plurality of reserve memory pages having physical addresses near an end of a physical address range of the memory block.

4. The method of claim 1, wherein the memory block includes a plurality of reserve memory pages having physical addresses dispersed throughout a physical address range of the memory block.

5. The method of claim 1, wherein the small update data is written to a next available reserve memory page located within the memory block.

6. The method of claim 1, further comprising the operation of determining whether a free reserve memory page is currently available in the memory block.

7. The method of claim 6, further comprising the operation of writing the small update data to a memory page of a new memory block when a free reserve memory page is currently unavailable in the memory block.

8. A non-volatile memory, comprising:
a plurality of memory blocks, each comprising a plurality of memory pages, the plurality of memory pages being logically divided into user data memory pages and reserve memory pages,
wherein small update data requested to be written to a target user data memory page in a memory block is written to a reserve memory page in the same memory block when the target user data memory page currently stores data and offset data is included within a spare area of the reserve memory page to indicate an offset to the target memory page related to the small update data, wherein a logical address associated with a physical address of the target memory page is temporarily remapped to indicate a physical address of the reserve memory page, and wherein the small update data written to the reserve memory page and remaining data from the memory block is later written to a new memory block in continuous order when time permits during system idle periods.

9. The non-volatile memory of claim 8, wherein the logical address is stored in a block table associated with the non-volatile memory.

10. The non-volatile memory of claim 8, wherein the logical address is located within a spare area of the target user data memory page.

11. The non-volatile memory of claim 8, wherein a logical address located in a spare area of the reserve memory page is mapped to indicate a physical address of the target user data memory page.

12. The non-volatile memory of claim 8, wherein the small update data is written to a memory page of a new memory block when a free reserve memory page is currently unavailable in the memory block.

* * * * *